Dec. 31, 1957     P. E. BESSIERE     2,818,516
ELECTRIC BRAKES

Filed May 18, 1953     2 Sheets-Sheet 1

INVENTOR
Pierre Etienne Bessiere
BY
Bailey, Stephens + Huettig
ATTORNEYS

Dec. 31, 1957 P. E. BESSIERE 2,818,516
ELECTRIC BRAKES
Filed May 18, 1953 2 Sheets-Sheet 2

INVENTOR
Pierre Etienne Bessiere
BY
Bailey, Stephens + Huettig
ATTORNEYS

United States Patent Office 2,818,516
Patented Dec. 31, 1957

2,818,516
ELECTRIC BRAKES

Pierre Etienne Bessière, Paris, France, assignor to Societe "Silto," Paris (Seine), France, a French society Application May 18, 1953, Serial No. 355,632

Claims priority, application France July 11, 1952

4 Claims. (Cl. 310—93)

The present invention relates to electric brakes essentially constituted by a rotor to be braked and by a stator, this stator including electro-magnets carried by a frame and which, when they are energized by an electric current, create in the rotor, during the relative rotary movement of the two above mentioned elements with respect to each other, Foucault currents which themselves produce a braking effect and a heating.

In order to achieve an efficient cooling of the elements of such a brake, it has already been proposed to place in each of the spaces located on either side of the middle transverse plane of the rotor, between this plane and the side plates of the frame, annular baffles formed by transverse partition elements extending from the periphery of the frame of the stator to a distance of the shaft of the rotor, so as to divide each of these spaces into two compartments, to wit, an outer one, located between the baffle and the side plate of the frame, and an inner one, located between the baffle and the rotor, these compartments communicating together along the shaft of the rotor. An air stream is caused to pass through these compartments, this air stream coming from the atmosphere into the outer compartment at the periphery thereof, circulating in a centripetal direction in this compartment, so as to cool the portion of the electro-magnets located in this compartment, then undergoing a change of direction when reaching the region close to the shaft while cooling this shaft by contact therewith and then circulating in the centrifugal direction in the inner compartment where it flows along the rotor and cools it, before leaving the brake.

This cooling air stream thus flows on either side of the rotor along a U-shaped path. This path has proved to be very useful, since all the parts of the brake that require cooling are thus cooled in a very efficient manner.

Up to the present time, in electric brakes where such cooling air streams are provided, the above mentioned baffle is located between the side plate of the frame and the flat pole pieces of the electro-magnets carried by this side plate, that is to say it divides the electro-magnets into two portions, one located in the outer compartment and the other in the inner compartment.

Such an arrangement has the disadvantages of offering a substantial resistance to the flow of air and of exerting unequal cooling actions on the portions of the electro-magnets located respectively in the two compartments above referred to.

The object of my invention is to provide an electric brake which is simpler of structure and more efficiently cooled than those existing up to now.

According to my invention, in an electric brake made as above stated, each of the baffles is located at a distance of the corresponding side plate of the frame at least equal to the distance from said side plate to the flat pole pieces of the electro-magnets, thus leaving the space in which are located the electro-magnets free from any partition.

Preferred embodiments of my invention will be hereinafter described with reference to the accompanying drawings, given merely by way of example, and in which.

Figure 1:
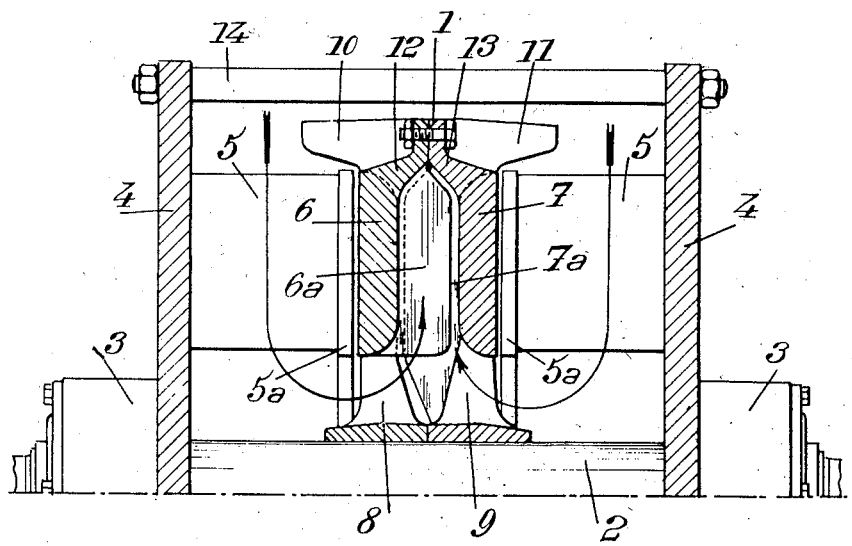
Fig. 1 is an axial sectional view of the top half of an electric brake made according to a first embodiment of my invention.

Electric brakes according to my invention as illustrated by the drawing include a metal rotor 1, for instance of soft steel, secured on a shaft 2 supported on either side of rotor 1 in bearings 3 mounted in the side plates 4 of the brake frame. The shaft 2 of the rotor either constitutes the part to be braked or is rigid with this part, whereas the frame is fixed to the structure on which the brake is mounted, for instance the chassis of a lorry.

On either side of rotor 1, between this rotor and side plates 4 are disposed electro-magnets 5 the outer ends of which are fixed on said side plates 4, whereas the inner ends of these electro-magnets are constituted in the usual manner by flat pole pieces 5a. The windings of these electro-magnets are inserted in electric circuits so as to create, when an electric current is flowing therethrough and rotor 1 is turning with respect to the stator, Foucault currents in the rotor which exert a braking effect on said rotor and also heat it.

This heating requires an intensive cooling of all the parts, which might otherwise be brought to detrimental temperatures. These parts are in particular the rotor itself, the electro-magnets and also the shaft which carries the rotor. It is also necessary to cool the portions of the shaft which are immediately close to the rotor so as to avoid heating of the bearings.

In order to exert this cooling action, it is advantageous to make use of air streams flowing along a U-shaped path, such air streams entering at the periphery of the brake and opposite electro-magnets 5, in a centripetal direction. Then, when the air stream reaches the vicinity of the shaft, it is caused to turn at 180°, so that after it has cooled the shaft and in particular the portions thereof located on either side of the rotor, it flows close to the rotor in a centrifugal direction and escapes into the surrounding atmosphere, opposite the periphery of the rotor.

Up to the present time, this U-shaped path air stream was obtained by means of a baffle provided in the space between the rotor and each of the side plates, such a baffle dividing said space into two compartments communicating together in the vicinity of the shaft, so that the outer ends of the electro-magnets were in the outer compartment and their inner ends in the inner compartment.

With such an arrangement, the inner ends of the electro-magnets were cooled by an air stream which had already flown along the shaft and was therefore relatively warm. Furthermore, the arrangement of such baffles offered a serious resistance to the flow of air.

In order to leave undivided, that is to say without the provision of a partition baffle therein, each of the spaces located on opposite sides of the rotor and in which are located the windings of the electro-magnets, I locate, according to my invention, the baffles at a distance from the respective side plates of the frame at least equal to the distance between said side plates and the flat pole pieces of the corresponding electro-magnets.

Of course, as in similar devices, the rotor must be arranged so as to exert a fan-like action whereby it creates, during its rotation, a suction in the vicinity of shaft 2 greater than that existing at its periphery.

For this purpose, rotor 1 is provided with centrifugal channels preferably constituted by blades carried by the rotor, the inlet openings of these channels communicating with the substantially annular spaces existing between shaft 2 and electro-magnets 5.

I have found that with such an arrangement the cooling effect is generally more intensive than that obtained by devices where the baffle partitions were located in the space occupied by the windings of the electro-magnets.

This unexpected result is due to the reduction of the resistance offered to the flow of air, through the above mentioned space.

I will now describe some embodiments of my invention.

Figure 2:
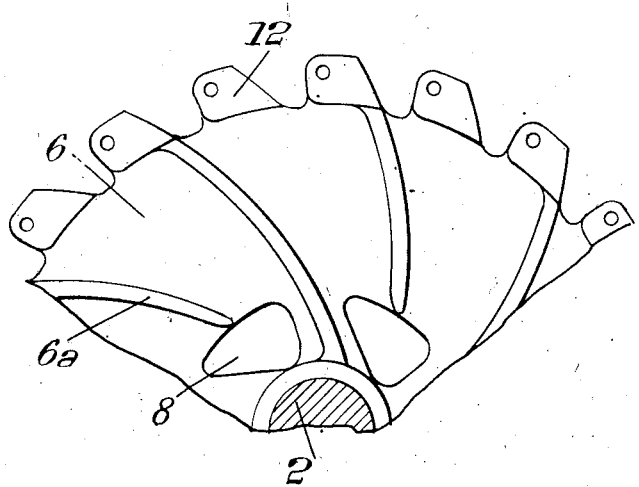
Fig. 2 is an elevational view of the portion of one of the discs which constitutes the rotor of the brake shown by Fig. 1.

In the construction illustrated by Figs. 1 and 2, the rotor is essentially constituted by two discs 6 and 7 rigidly fixed on shaft 2 and at a distance from each other. Each of these discs is provided, on the side which faces the other disc, with blades 6a, 7a which divide the interval between the two discs 6 and 7 into a plurality of channels extending from the periphery of the rotor to the vicinity of shaft 2 and which therefore act in the same manner as the channels of a fan. Blades 6a and 7a may be engaged between one another. They may be either radial and rectilinear or curvilinear as shown by Fig. 2. The inlet apertures of the channels formed between blades 6a and 7a communicate through holes 8 and 9 provided in disc 6 and 7 close to the shaft 2 with the substantially annular spaces existing between shaft 2 and each of the circular groups of electro-magnets 5.

Disc 6 and 7 may further be provided, as shown by the drawing, with peripheral lugs 10 and 11 extending outwardly and with lugs 12 and 13 extending inwardly. Every lug 12 of one of the discs is secured to the corresponding lug 13 of the other disc, so as to fix the two discs together in the vicinity of their periphery.

The space between the peripheries of side plates 4 is advantageously free from any wall, whereby air can freely enter the brake or flow out therefrom over the whole length between said side plates 4. Preferably, these side plates are assembled together by means of bolts 14 distributed over the periphery of the brake.

When shaft 2 and rotor 1 rotate together with the stator, the suction produced in apertures 8, 9 is such that the air located inside the brake, opposite the electro-magnets, is sucked in centripetally, thus flowing along the windings of the electromagnets, toward shaft 2 and to a short distance thereof (i. e. the distance from these apertures 8, 9 from the shaft) after which the air stream undergoes a change of direction of 180° through apertures 8, 9, and passes into the channels formed between discs 6 and 7 and their blades 6a and 7a, thus flowing through the channels centrifugally and escaping at the periphery into the external atmosphere.

Figure 3B:
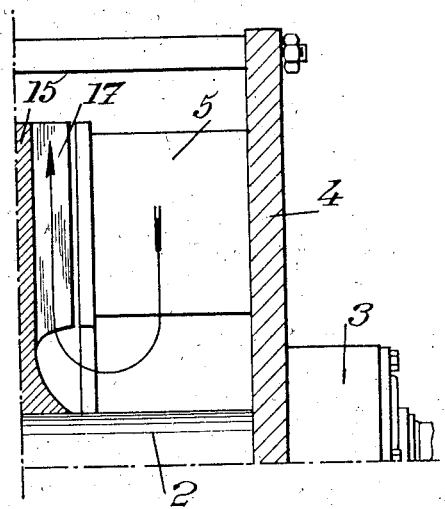
Figs. 3a and 3b are axial sectional views showing portions of two electric brakes made according to two other embodiments of my invention respectively.
Figure 3A:
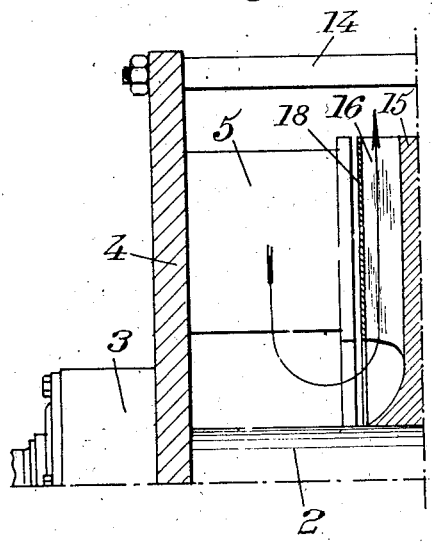

In the embodiment illustrated by Figs. 3a, 3b, the fan channels of the rotor are located on either side of a single disc 15 which constitutes the rotor and the fan channels 16, 17 are located along the side faces of the rotor opposite the flat pole pieces of the electro-magnets 5. These channels are separated from one another by blades rigid with disc 15 and the edges of which extend very close to said electro-magnet pole pieces. These fan channels 16 and 17 may be closed on the side adjacent to the pole pieces of the electro-magnets by a partition 18 (Fig. 3a) carried by the rotor and extending along the edges of the fan blades or, in the embodiment illustrated by Fig. 3b, the fan channels 17 are open opposite the electro-magnet pole pieces. But in this last mentioned case, said pole pieces are given a widened area, for instance a trapezoidal one (seen in the direction of the axis of the electro-magnet), so that their edges are nearly in contact with each other and that the whole of these pole pieces constitutes a kind of annular partition forming the baffle above referred to and which is merely interrupted by relatively narrow slots.

With such arrangements, I obtain the same advantage as above referred to concerning the construction of Figs. 1 and 2.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electric brake which comprises, in combination, a frame constituted essentially by two side plates located at a distance from each other, with the space between them in substantially free communication with the atmosphere, a shaft journalled in said frame extending through said side plates transversely thereto, said side plates completely closing the space therebetween in a direction axially of the shaft, a substantially disc-shaped rotor fixed to said shaft at right angles thereto half-way between said plates, a plurality of electro-magnets distributed about the shaft axis in two sets mounted respectively on the inner walls of said side plates, each electro-magnet including a flat pole piece parallel and close to the adjacent face of said rotor, said rotor being made of a metal in which Foucault currents are produced in response to the rotation thereof between said electro-magnets, only two baffles, one on each side of said rotor, extending around said shaft transversely thereto from a region at a distance from the axis of said shaft substantially equal to the radius of said rotor to a region close to said shaft but at a distance therefrom, each of said baffles being located between the transverse middle plane of said rotor and one on said side plates and at a distance from said last mentioned side plate at least equal to the distance between said side plate and the flat pole pieces of the electro-magnets carried by said last mentioned side plate, said side plates being solid whereby air can enter the spaces between said side plates and said baffle only radially from the periphery of the brake and not at all near said shaft, and blade means carried by said rotor for causing air to flow centrifugally along the faces of said rotor which carry said blades.

2. A brake according to claim 1, in which said rotor is constituted by two discs parallel to each other, the fan means being constituted by blades carried by the inner faces of said discs respectively, each of said baffles being constituted by one of said discs, provided with apertures in the region thereof close to said shaft.

3. A brake according to claim 1, in which said fan means are constituted by blades carried by the outer side walls of said rotor and each of said baffles is constituted by a partition carried by said rotor transverse to the shaft and extending along the side edges of said blades.

4. A brake according to claim 1, in which said fan means are constituted by blades carried by the outer side walls of said rotor and each of said baffles is constituted by the flat pole pieces of the electro-magnets located on one side of the rotor, said flat pole pieces extending to a close distance from each other so as to form together an annular partition with narrow radial slots therein.

References Cited in the file of this patent

UNITED STATES PATENTS

| | | |
|---|---|---|
| 2,110,663 | Gouldthorpe | Mar. 8, 1938 |
| 2,503,704 | Bessiere | Apr. 11, 1950 |
| 2,575,000 | Bessiere | Nov. 13, 1951 |
| 2,640,941 | Winther | June 2, 1953 |

FOREIGN PATENTS

| | | |
|---|---|---|
| 661,027 | Germany | June 9, 1938 |
| 698,381 | Germany | Nov. 8, 1940 |
| 966,738 | France | Mar. 8, 1950 |
| 1,011,331 | France | Apr. 2, 1952 |
| 1,011,762 | France | Apr. 9, 1952 |